United States Patent [19]
de Putter

[11] 3,931,853
[45] Jan. 13, 1976

[54] DEVICE FOR THE SUPPLY AND DISCHARGE OF COOLING LIQUID IN THE WORMS OF AN EXTRUDER PRESS
[75] Inventor: Warner Jan de Putter, Hardenberg, Netherlands
[73] Assignee: Wavin B.V., Zwolle, Netherlands
[22] Filed: Oct. 16, 1973
[21] Appl. No.: 406,924

[30] Foreign Application Priority Data
Oct. 17, 1972 Netherlands................ 7214008

[52] U.S. Cl. ............... 165/87; 425/378; 259/191; 285/190
[51] Int. Cl.² .......................................... F28F 5/06
[58] Field of Search.................. 165/87, 88, 89; 277/DIG. 8; 425/378, 379, 107; 259/191; 92/169; 285/94, 136, 190

[56] References Cited
UNITED STATES PATENTS
1,939,236  12/1933  Fox et al............................. 165/89
2,270,927  1/1972   Browne.......................... 285/963;94
3,180,236  4/1965   Beckett................................ 92/169
3,285,614  11/1966  McClenathan....................... 277/62
3,660,000  5/1972   Yoshida et al....................... 425/378

Primary Examiner—Charles J. Myhre
Assistant Examiner—Theophil W. Streule, Jr.
Attorney, Agent, or Firm—Holman & Stern

[57] ABSTRACT

Device for the supply and discharge of cooling liquid in the worms of an extruder press, the worm or worms being situated at some distance from the housing, being provided with a stationary sleeve with a stationary centering ring near both ends thereof and rotatable adjusting rings on each of its sides. The sleeve is furnished with at least two circular chambers, which are delimited by sealing rings, these chambers being in open communication with cooling liquid channels in the worm shaft and which are each connected with an external supply and discharge pipe for the cooling liquid, while part of the sleeve comprises oil holes and overflow openings.

8 Claims, 1 Drawing Figure

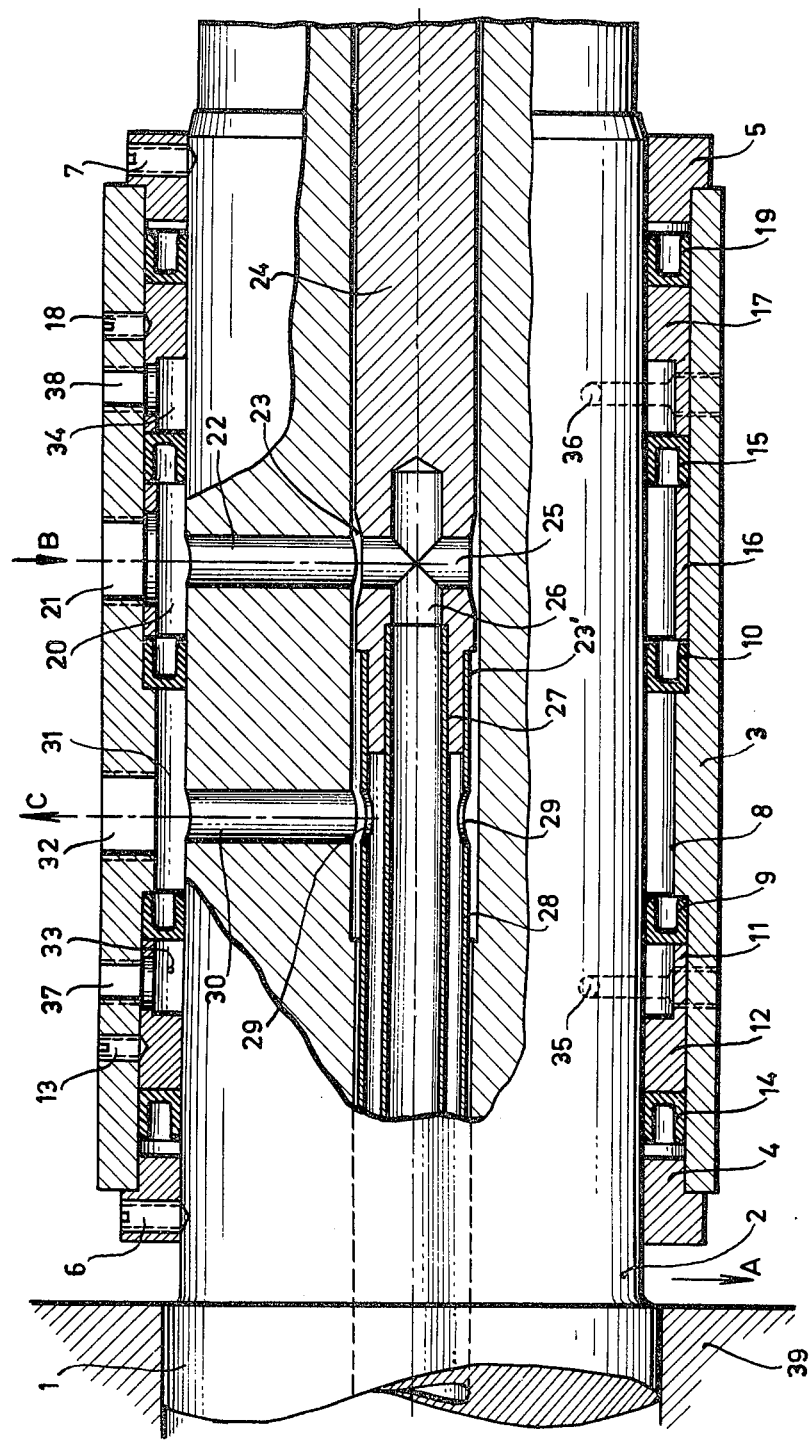

DEVICE FOR THE SUPPLY AND DISCHARGE OF COOLING LIQUID IN THE WORMS OF AN EXTRUDER PRESS

DISCUSSION OF THE PRIOR ART

My invention relates to a device for the supply and discharge of cooling liquid in the worms of an extruder press. Known devices of this type suffer from the disadvantage that already after a short time, the cooling liquid starts leaking considerably.

A first reason for this is that small quantities of material from the press, leak along the worm and impair the sealing, while in twin worm extruders yet another reason can be indicated, viz. the slight movements of the two worms with respect to each other, which cannot be compensated without leakage by the known sealings, because the sealings for the two worms are disposed in a common supply- and discharge housing.

SUMMARY OF THE INVENTION

My invention aims to solve the leakage problem in such an extruder press and this is attained according to my invention, by the arrangement that each worm at some distance from the housing is provided with a stationary sleeve which is sealingly disposed around the worm shaft and which is provided with at least two circular chambers, delimited by sealing rings, which are in open communication with cooling liquid channels in the worm shaft and which are each connected with an external supply- and discharge pipe for the cooling liquid, while at the two ends of the sleeve, or each sleeve, centering and adjusting rings are disposed.

Due to this construction there is achieved that along the housing of the press means whereby leaking material can no longer damage the sealing, while moreover relative movement of the twin worm extruder's no longer influence the sealing.

Preferably a stationary centering ring is provided in the sleeve, or in each sleeve, in the proximity of the two ends thereof, while on either side of the sleeve(s) adjusting rings, rotating along, are mounted on the worm shaft. An additional sealing ring may be provided at each end of the sleeve between the centering ring and the adjusting ring. Hereby is achieved that the sealing rings are relieved in a radial direction.

BRIEF DESCRIPTION OF THE DRAWINGS

In the drawing a section through the device is shown.

DESCRIPTION OF PREFERRED EMBODIMENT

The device described is meant for a twin worm extruder press known in the art and is individually mounted on each worm shaft between the housing and the drive- and thrust bearing end of the worm shaft. Only a single worm shaft provided with a relative device is depicted and described hereinafter. The device can likewise be applied to a single worm extruder press.

At the end 1 of the worm shaft remote of the pressing side of the worm, on a part 2 of that shaft with a slightly reduced diameter, a sleeve is mounted with radial clearance. This sleeve is in axial direction enclosed by adjusting rings 4 and 5 at its ends. In the depicted embodiment, the adjusting rings 4 and 5 show on the side turned towards the sleeve, a portion with a reduced diameter, which engages the space between the sleeve 3 and the part 2 of the shaft. The adjusting rings 4 and 5 can be secured on the part 2 of the shaft by means of screws 6 and 7.

In the proximity of its centre length, sleeve 3 is provided with a part 8 of reduced inner diameter. On either side of sleeve part 8 sealing rings 9 and 10 are situated of substantially C-section. The sealing ring 9 is retained against the left-hand shoulder of part 8 by a lateral elongation 11 of a centring ring 12, disposed in the space between sleeve 3 and the shaft 2. The centering ring 12 fits exactly between sleeve 3 and shaft 2 and is fastened in sleeve 3 by means of a screw 13. In the space between the centering ring 12 and the lefthand adjusting ring 4 is disposed another sealing ring 14.

Rightwards from sealing ring 10, in the space between sleeve 3 and shaft 2, another sealing ring 15 is positioned which is held in spaced relationship from sealing ring 10 by a spacer ring 16, the inner diameter of which is about equal to the inner diameter of part 8 of sleeve 3. The rings 10, 16 and 15 are pressed against the righthand shoulder of sleeve part 8 by means of a lateral projection of a centering ring 17 fitting exactly in the space between sleeve 3 and shaft 2 and which, rightwards from the sealing ring 15, is disposed in that space and fixed in the sleeve 3 by a screw 18. Between the centering ring 17 and the right-hand adjusting ring 5 is yet another sealing ring 19.

The sealing rings 10 and 15 delimit laterally a chamber 20, situated within the ring 16. This chamber communicates via a radial bore 21 in the sleeve and the ring 16, with a non-depicted feed line for cooling liquid. In the radial plane containing the centre line of the bore 21, a radial bore 22 is made in part 2 of the worm shaft opening into an axial bore 23 which extends through the worm shaft 1 and serves for the supply and discharge of the cooling liquid to and from the worm. The axial bore 23 is closed on the outer side of the worm shaft by a plug 24 which opposite the radial bore 22 is provided with a radial bore 25 which via a blind axial bore 26, opens at the left end of the plug 24. Leftwards from the radial bore 22 the end of the plug 24 forms a sealing closure between the rightward part of the bore 23 and the continuation 23' of this bore which is situated leftwards from the plug. In the part 23' of the axial bore are situated two concentrical tubes 27 and 28, the tube 27 constituting a continuation of the channel 26 and serving for the supply of the cooling liquid to the worm. The space around the tube 27 and within the tube 28, situated concentrically around the former, serves for the discharge of the cooling liquid from the worm and communicates via holes 29 with the space 23' which via a radial bore 30 in part 2 of the worm shaft communicates again with the chamber 31 which is externally delimited by the narrowed part 8 of the sleeve 3 and on either side is delimited by the sealing rings 9 and 10. This chamber 31 communicates via a radial bore 32 in the sleeve 3, the centre line of which is in the same radial plane as the bore 30, with the non-depicted discharge pipe for the cooling liquid.

The outer tube 28 is only utilized when a part of the worm should not be cooled. In other cases it can be omitted; then the liquid can be simply returned around the inner tube 27 into the bore of the shaft.

The spaces 33 and 34 under the lateral elongations of the centring rings 12 and 17 communicate on their upper side via radial bores 37 and 38 with the outer side of the sleeve 3, in order to permit lubricant being introduced into the spaces 33 and 34. These spaces 33 and 34 are provided at a minor height above their lower end with overflow bores 35 and 36 which likewise, via downwards inclined channels, are connected with the space outside the sleeve 3, so that they delimit the level to which the spaces 33 and 34 can be filled with lubricant.

The left-hand adjusting ring 4 is spaced from the housing 39 of the extruder, so that material escaping along the worm, which runs down along the housing 39 does not contact the above-described supply- and discharge device, see the arrow A.

On the worm shafts of the twin worm extrusion press is provided a supply- and discharge device in such a way that the sleeves 3 of the two devices are prevented from turning; yet the sleeves 3 of the two devices are capable of making minor movements of the worm shafts, both in axial and in circumferential direction. Each sleeve 3 thus has a fixed position with respect to the worm shaft rotatably accommodated therein, but the movements of the two worm shafts with respect to each other cannot influence the sealing.

The sealing rings 9, 10, 14, 15 and 19 are preferably constructed of a heat-resistant synthetic material like Viton with properties and design such, that as a consequence of a pressure difference between the high pressure — and the low pressure side, they are sealingly pressed against the shaft. The sealing rings are preferably of substantially C-section, the open side of the C-section being directed to the side with the highest pressure.

The operation of the described device is as follows:

The cooling liquid is supplied in the direction of the arrow B and flows via the bore 21, the chamber 20 and the bores 22, 25 and 26 towards the inner tube 27 which transmits the cooling liquid towards the worm. Via the space between the inner tube 27 and the outer tube 28, the cooling liquid flows back via the holes 29, the bore 30, the chamber 31 and the bore 32 in the direction of the arrow C to the discharge pipe for the cooling liquid. Consequently the pressure of the cooling liquid is lower in the chamber 31 than in the chamber 20. A proper effect of the sealing ring 10 is therefore ensured. A proper effect of the sealing rings 9 and 15 is likewise ensured because these rings are exposed to the pressure in the chambers 31, 20, respectively, while the other side is in open communication with the atmosphere via the spaces 33 and 34. The bronze centering rings 12 and 17 absorb the radial forces, so that the sealing rings thereof are discharged and wear of these sealing rings is prevented. The abutting surface between the centering rings 12 and 17 and the worm shaft 2 can be lubricated at regular intervals by introducing lubricant into the spaces 33 and 34 via apertures 37 and 38. Since these spaces communicate with the atmosphere no pressure can build up therein, while moreover the overflow openings 35 and 36 limit the lubricant level in those spaces. The rotary adjusting rings 4 and 5 prevent the sleeve 3 from shifting in the longitudinal direction with respect to the worm shaft 2. The rings are lubricated by leaking oil from the spaces 33 and 34 which axially move outwards via the sealing rings 14 and 19. In opposite direction the rings 14 and 19 seal, so that oil fouled by dust from the surroundings is prevented from flowing back.

What I claim is:

1. An assembly to circulating a cooling liquid in the shaft of an extruder press, comprising, in combination:
   a shaft having an axial bore portion, radially extending, axially-spaced inlet and outlet passages communicating with the bore portion and the outer surface of the shaft;
   conduit means in said bore portion, said conduit means comprising individual conduit portions respectively communicating with the inlet and outlet passage for conducting the liquid through the shaft;
   three axially-spaced seals circumposed about the shaft in flanking relation to the inlet and outlet passages, an intermediate one of said seals cooperating with the respective remaining seals and defining annular liquid inlet and outlet chambers about said shaft, separated by said intermediate seal;
   spacer means circumposed about said shaft and engaged with the seals for retaining them in axially-spaced relation on the shaft, said spacer means being spaced radially from the outer surface of said shaft and said seals having portions projecting radially inwardly beyond said spacer means and into engagement with the outer surface of the shaft;
   a tubular sleeve circumposed about the outer periphery of said seals and spacer means and including openings communicating with the respective inlet and outlet chambers;
   centering rings circumposed about said shaft, abutting the outermost of said seals for retaining the seals in a relative fixed relation;
   means retaining the sleeve in fixed relation to said centering rings;
   retention collar means circumposed about said shaft at opposite ends of the sleeve; and
   means retaining the collar means in fixed relation on the shaft, said retention collar means comprising a ring member including an axial annulus projecting into the sleeve ends for orienting the sleeve on the shaft, said means retaining the collars comprising fasteners adjustably retaining the assembly on the shaft, annular lubricating chambers outwardly of the outermost annular seals and within said centering rings, and further annular seals circumposed about said shaft between said centering rings and retention collar means outwardly of said lubricating chambers.

2. The assemby as claimed in claim 1 including lubricant overflow opening in said sleeve and communicating with the lubricating chambers outwardly of the fluid inlet and outlet chambers.

3. The assembly as claimed in claim 1 in which said spacer means comprise annular collar members having an annular, axially-directed flange overlying the lubricating chambers and abuting the outermost seals at one side of the fluid inlet and outlet chambers.

4. The assembly as claimed in claim 1, in which said spacer means comprise an annular collar circumposed about the fluid inlet chamber and defining the outer limits thereof, said sleeve having an inwardly projecting annulus overlying the outlet chamber and spacing the seals thereat.

5. The assembly as claimed in claim 4 in which said seals comprising a heat-resistant synthetic material.

6. The assembly as claimed in claim 4, in which said seals have a C-shaped cross section, the seals flanking the inlet chamber opening toward each other whereby fluid pressure reacts on the seals to urge them into sealing relation with the shaft and sleeve at respective inner and outer portions of the chamber.

7. The assembly as claimed in claim 1 in which said conduit means comprises coaxial conduits, one conduit terminally communicating with one of the fluid inlet and outlet passages, another conduit being defined by the outer surface of said one conduit and communicating with the other of the fluid inlet and outlet passages.

8. The assembly as claimed in claim 1 in which said spacer means include bronze bearing portions between said shaft and sleeve, said retention collar means being of a bronze material and being telescoped into said sleeve.

* * * * *